United States Patent [19]

Leberre et al.

[11] Patent Number: 5,043,427

[45] Date of Patent: Aug. 27, 1991

[54] PROCESS AND INSTALLATION FOR CONTINUOUSLY FRACTIONATING PLANT, ANIMAL OR HUMAN PROTEINS

[75] Inventors: Catherine Leberre, Lanorville; Alain Faure, Villebon-Sur-Yvette; Gilles Beaudoin, Le Chesnay; Brigitte Roche, Paris; Pierre Colinart, Bagneux; Henri Renon, Sceaux, all of France

[73] Assignee: Foundation Nationale de Transfusion Sanguine, Paris, France

[21] Appl. No.: 359,859

[22] Filed: May 31, 1989

[30] Foreign Application Priority Data

Jun. 7, 1988 [FR] France .................. 88 07561

[51] Int. Cl.$^5$ .................. C07K 3/24; C07K 3/26
[52] U.S. Cl. .................. 530/370; 530/350; 530/419; 530/412; 530/421; 530/362; 530/363; 530/364; 530/418
[58] Field of Search .............. 530/419, 412, 421, 418, 530/370, 350, 362, 363, 364

[56] References Cited

U.S. PATENT DOCUMENTS

| | | | |
|---|---|---|---|
| Re. 31,268 | 6/1983 | Hansen | 530/387 |
| 2,765,299 | 10/1956 | Porsche et al. | 530/364 |
| 3,992,367 | 11/1976 | Plan et al. | 530/364 |
| 4,177,188 | 12/1979 | Hansen | 530/364 |
| 4,217,418 | 8/1980 | McAleer | 435/239 |
| 4,335,214 | 6/1982 | Adamowicz | 435/239 |
| 4,421,682 | 12/1983 | Edwards et al. | 530/380 |
| 4,446,066 | 5/1984 | Luijerink | 530/380 |

OTHER PUBLICATIONS

Preparative Biochemistry, vol. 14, No. 1, pp. 1–17, Marcel Dekker, Inc.; A.F.S.A. Habeeb et al.: "Preparation of Human Immunoglobin by Caprylic Acid Precipitation".

Method Plasma Protein Fractionation, editor J. M. Curling, pp. 33–56, Academic Press, London, U.K.; M. Steinbuch: "Proteion Fractionation by Ammonium Sulphate, Rivanol and Caprylic Acid Precipitation".

*Primary Examiner*—Margaret Moskowitz
*Assistant Examiner*—Keith C. Furman
*Attorney, Agent, or Firm*—McAulay Fisher Nissen Goldberg & Kiel

[57] ABSTRACT

This invention relates to a process for continuously fractionating plant, animal or human proteins by selective precipitation of the proteins resulting from placing a solution of proteins in contact with a precipitating agent constituted by a fatty acid of 6 to 14 carbon atoms, such as caprylic acid, is characterized in that respective deliveries of fatty acid and of the protein solution are continuously placed in contact in a mixing chamber of small volume with respect to the deliveries, creating a strong stirring in this mixing chamber; the individual deliveries of fatty acid and of protein solution are adjusted to controlled pH and temperature so as to maintain their ratio equal to a predetermined value; the mixture is then allowed to evolve during a phase of maturation so as to form a suspension; this suspension is separated into a liquid part from which are extracted the proteins having remained soluble, and a solid part containing proteins of different nature; and the parameters intervening in the process, such as delivery, pressure, temperature, pH, resistivity, are permanently monitored. The invention also relates to an installation for carrying out said process.

18 Claims, 2 Drawing Sheets

PROCESS AND INSTALLATION FOR CONTINUOUSLY FRACTIONATING PLANT, ANIMAL OR HUMAN PROTEINS

FIELD OF THE INVENTION

The present invention relates to a process and an installation for continuously fractionating plant, animal or human proteins enabling purified and concentrated proteins to be obtained.

BACKGROUND OF THE INVENTION

The industrial techniques for fractionating proteins which are most used are based on a selective precipitation of the proteins by placing a solution of proteins in contact with a precipitating agent and by playing on the conditions of pH of ionic force, the nature and concentration of the precipitating agents. Among the precipitating agents which have been tested to that end, mention may be made of fatty acids comprising 6 to 14 carbon atoms and in particular caprylic acid which presents the advantage of allowing separation at ambient temperature and of being a stabilizing agent of numerous proteins.

As described in PREPARATIVE BIOCHEMISTRY, Vol. 14, No. 1, 1984, pages 1-17, Marcel Dekker, Inc.; A.F.S.A. HABEEB et al. "Preparation of human immunoglobulin by caprylic acid precipitation", a process for purification of immunoglobulins by caprylic acid plasma precipitation, followed by a step of chromatography, is already known. This process is a process of the "batch" type which means that the caprylic acid/protein ratio which enables the desired precipitation to be obtained is attained only at the end of the addition of the caprylic acid in the whole plasma batch. The caprylic acid is added with vigorous stirring which is provided by a mechanical means. The suspension obtained is centrifuged and filtered if necessary to remove the fine particles. Such a process, due to its basic conception, obviously does not lend itself to use on an industrial scale.

The present invention concerns improvements relating to such a process so as to allow it to be carried out continuously, with a high yield.

SUMMARY OF THE INVENTION

To that end, this process for continuously fractionating plant, animal or human proteins by selective precipitation of the proteins resulting from placing a solution of proteins in contact with a precipitating agent constituted by a fatty acid of 6 to 14 carbon atoms, such as caprylic acid, is characterized in that respective deliveries of fatty acid and of the protein solution are continuously placed in contact in a mixing chamber of small volume with respect to the deliveries, creating a strong stirring in this mixing chamber; the individual deliveries of fatty acid and of protein solution are adjusted to controlled pH and temperature so as to maintain their ratio equal to a predetermined value; the mixture is then allowed to evolve during a phase of maturation so as to form a suspension; this suspension is separated into a liquid part from which are extracted the proteins having remained soluble, and a solid part containing proteins of different nature; and the parameters intervening in the process, such as delivery, pressure, temperature, pH, resistivity, are permanently monitored.

The invention also relates to an installation for carrying out the continuous fractionation process mentioned above.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
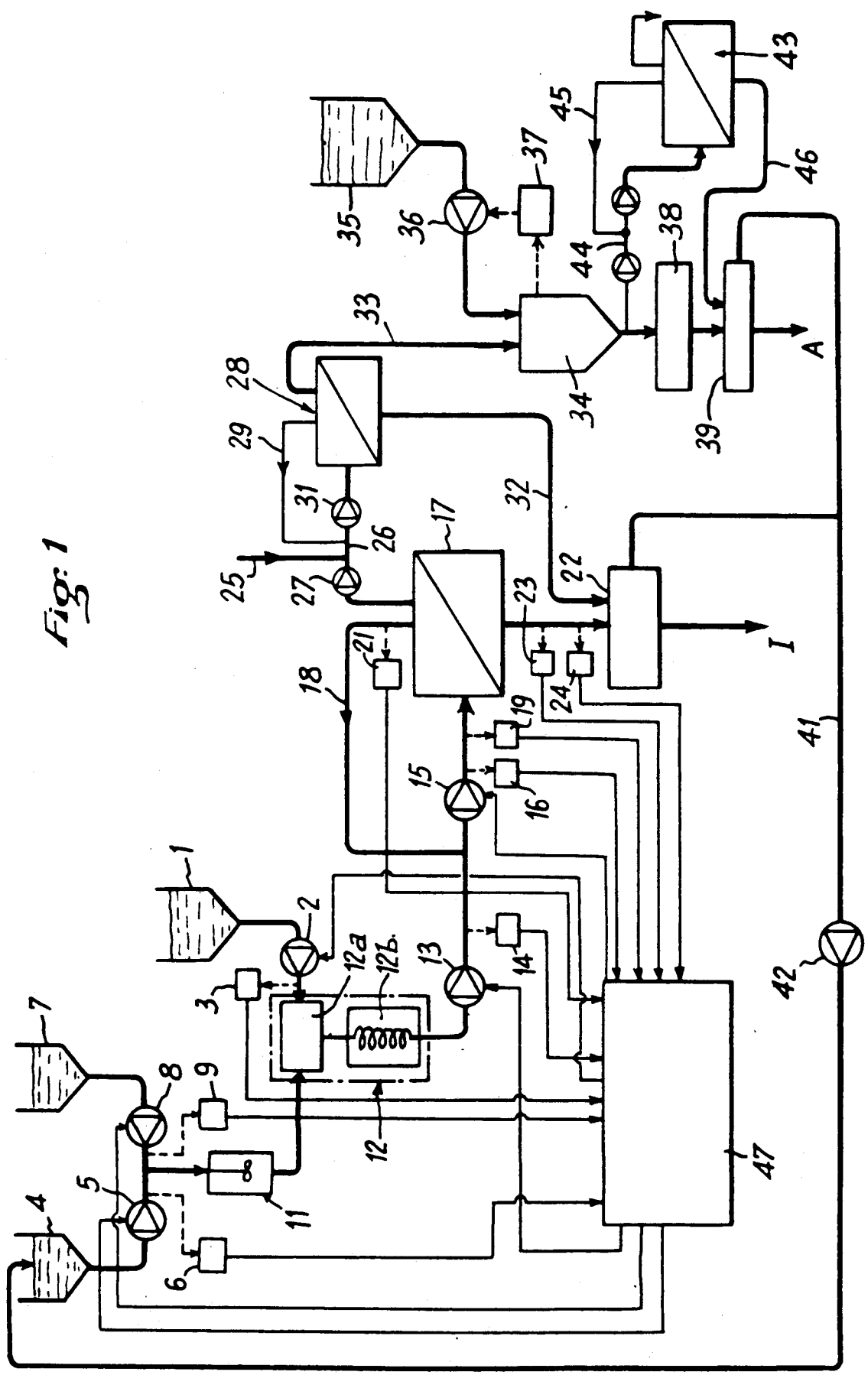
FIG. 1 is a block diagram of an installation for carrying out the process according to the invention for continuously fractionating proteins.

Referring now to the drawings, the process according to the invention for fractionating proteins is carried out by means of an installation as schematically shown in FIG. 1 and it will principally be described, by way of non-limiting example, in the case of application to the fractionating of plasmatic proteins. The plasma containing the proteins having to be fractionated is contained in a recipient 1 and it is drawn off from this recipient by means of a pump 2 of which the flowrate is monitored by a flowrate sensor 3. The raw material which may be constituted by a human plasma from which the coagulation factors have been removed by cryoprecipitation, is preferably diluted to one third with an acetate 0.06M buffer having a pH of 4.8.

The fatty acid which is used as precipitating agent is contained in a recipient 4 from which it is drawn off by a pump 5, the flowrate of this pump being monitored by a flowrate sensor 6. The fatty acid may be previously dispersed in an acetate 0.06M buffer of pH 4.8, which is contained in a recipient 7. This buffer is drawn off by a pump 8 whose flowrate is monitored by a flowrate sensor 9. The deliveries of fatty acid and of acetate buffer are introduced in a homogenizer 11 which furnishes at its outlet an emulsion of the fatty acid in the acetate buffer. The fatty acid emulsion and the plasma are continuously brought into contact in a device 12 which comprises a mixing chamber 12a of small volume with respect to the flowrates of the plasmatic protein solution and of precipitating agent, in which chamber a strong stirring is created, promoting contacting, and a maturation chamber 12b in which the intimate mixture of plasmatic protein solution and of precipitating agent dwells for a predetermined period of time. Contacting and subsequent maturation provoke virtually instantaneous precipitation of certain proteins of the plasma, particularly albumin, with a 100% yield of the latter. The other proteins, namely the immunoglobulins, remain in solution.

The suspension issuing from the maturation chamber 12b is then transmitted, by a circuit comprising a pump 13 whose flowrate is monitored by a flowrate sensor 14, to the inlet of a separation stage 17 which may be constituted by a centrifuge or a microfiltration unit. By way of example, this microfiltration unit may be constituted by a recirculation pump 15 of which the flowrate is monitored by a flowrate sensor 16. The flowrate entering the filter 17 is the sum of the flowrates coming from the pump 13 and a recirculation loop 18. Pressure sensors 19 and 21 are provided to note the pressures respectively at the inlet of the microfiltration unit 17 and in the recirculation loop 18. The microfiltration unit 17 ensures separation of the continuously entering suspension into a filtrate and a residue.

The filtrate is transmitted to a stage 22 of concentration by ultrafiltration. This stage furnishes at its outlet the immunoglobulins I. The pressure and flowrate at the inlet in the concentration stage 22 are respectively monitored by sensors 23 and 24.

The residue issuing from the microfiltration unit 17 may have a washing liquid added thereto, whose composition is chosen so as to provoke no modification of the quantity and composition of the precipitate. In the example described here, this washing liquid is constituted by a sodium acetate 0.06M buffer of pH 4.8 saturated with caprylic acid. The washing liquid is introduced through a pipe 25 joined to a pipe 26 on which is connected a pump 27 and which extends between the outlet of the residue from the microfiltration unit 17 and the inlet of another microfiltration unit 28. This microfiltration unit 28 is in turn provided with a recirculation loop 29 comprising a recirculation pump 31. With this micofiltration unit 28 are associated flowrate and pressure sensors (not shown), similar to those illustrated with regard to the first microfiltration unit 17. The second microfiltration unit 28 thus ensures treatment of the residue coming from the first microfiltration unit 17 and the separation thereof into a filtrate which is transmitted to the concentration stage 22, via a pipe 32, and a fresh residue. This operation may, if necessary, be repeated several times.

The residue issuing from the last washing stage, illustrated by the microfiltration unit 28, is transmitted to a solubilizer 34 in which is also introduced a solubilizer medium contained in a recipient 35. The solubilizer medium is pumped into the solubilizer 34 by a pump 36 whose flowrate is variable as a function of data measured by a sensor 37. The solubilizer medium is chosen either to solubilize the whole of the precipitate or to produce a precipitate of different composition. In the first case, the solution issuing from the solubilizer 34 is transmitted to a clarification stage 38 then to a stage 39 of concentration by ultrafiltration. This concentration stage 39 delivers at its outlet concentrated albumin A. The reagent, i.e. the fatty acid, is recovered from the two concentration stages 22 and 39 and it is transmitted, via a pipe 41 on which is connected a pump 42, to the recipient 4 containing the fatty acid, in order to be recycled.

If solubilization leads to a precipitate of different composition, it is possible to recover this precipitate by passage in another microfiltration unit 43, with or without washing. To that end, the outlet of the solubilizer 34 is connected, by a pipe 44, to the inlet of the microfiltration unit 43 which is provided with a recirculation loop 45 and the filtrate outlet of unit 43 is connected by a pipe 46 to the concentration stage 39.

The whole of the installation is controlled by a control device 47 which receives information relative to the various parameters employed in the process according to the invention, coming from the different sensors, such as flowrate sensors 6, 9, 14, 16, 23, pressure sensors 19, 21, 24, as well as from other sensors (not shown) such as temperature, pH, resistivity sensors, and which consequently controls the various pumps for circulating the different liquid flows so as always to maintain the same proportion of the elementary flowrates. Continuous fractionation of the different proteins, namely immunoglobulins I and albumin A contained in the plasma introduced in recipient 7, may thus be effected. As stated hereinabove, separation of the proteins may also be effected by means of a centrifuge, in place of the microfiltration unit 17, giving a supernatant and a precipitate thereafter treated separately.

Figure 2:
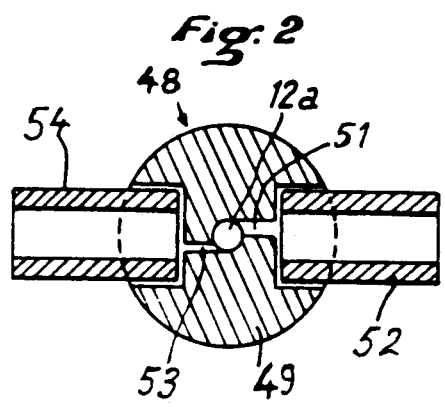
FIG. 2 is a view in horizontal section of a hydrocyclone used as contacting device in the installation according to the invention.
Figure 3:
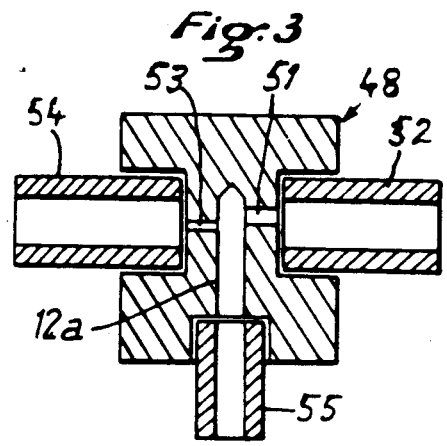
FIG. 3 is a view in axial and vertical section of the hydrocyclone of FIG. 2.

The mixing chamber 12a may advantageously be that of a hydrocyclone 48 as shown in FIGS. 2 and 3. This hydrocyclone comprises a body 49 in the central part of which is formed the vertical mixing chamber 12a of cylindrical form and of small diameter. In the upper part of the cylindrical mixing chamber 12a there open out tangentially two opposite inlet orifices, namely an inlet orifice 51 for the plasmatic protein solution, which communicates with an inlet connection 52 joined to the pipe supplying protein solution coming from recipient 1, and an inlet orifice 53 for the precipitating agent, which communicates with a connection 54 joined to the homogenizer 11. The diameters of the orifices 51 and 53 are chosen as a function of the respective flowrates of plasmatic protein solution and of precipitating agent which must be introduced in the mixing chamber 12a. In the present case, the diameter of the inlet orifice 51 for the plasmatic protein solution is larger than the diameter of the inlet orifice 53 for the precipitating agent. The ratio between the flowrates of precipitating agent and of plasmatic protein solution is less than a unit and is maintained at a predetermined value, this ratio being for example 0.048. This ratio of the flowrates is maintained at a constant value by the control device 47 acting on the metering pumps.

The flowrates of plasmatic protein solution and of precipitating agent are introduced tangentially in the vertical mixing chamber 12a of small volume and they flow downwardly, following an eddying movement which promotes contact between the two liquids. In its lower part, the mixing chamber 12a communicates with an outlet connection 55 which is connected to the maturation chamber 12b.

Some embodiments of the precipitation process and installation according to the invention will now be described, in the case of different protein solutions comprising a human plasma and plant protein solutions.

Figure 4:
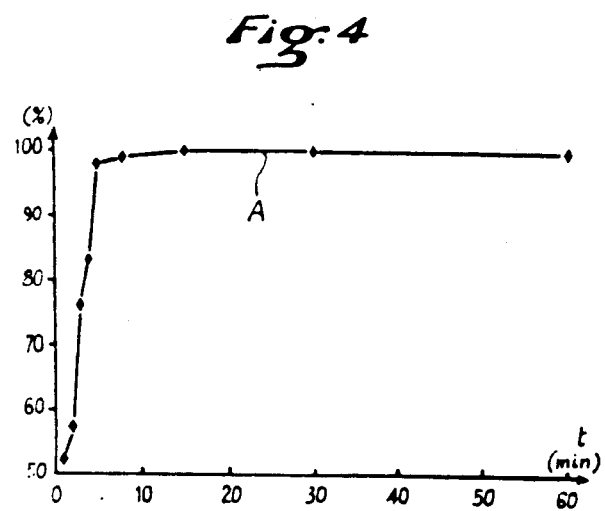
FIG. 4 is a diagram illustrating the variation of the percentage of the albumin precipitated from a blood plasma, as a function of time.

The case will firstly be considered of human plasma of which the proteins are precipitated by a fatty acid. There is added to a volume of plasma previously diluted to 20 g/l in albumin and adjusted to a pH of 4.8, via the hydrocyclone 48, a volume of emulsion of dispersed fatty acid. Due to this contact between the fatty acid emulsion and the protein solution, the albumin of the plasma is rapidly precipitated, in less than 5 minutes as shown by curve A in FIG. 4. In the diagram of this Figure, the percentage of precipitated albumin A is plotted on the y-axis whilst the time t is indicated on the x-axis, in minutes. The test was carried out at a temperature of 20° C. and with a weight ratio c8/alb=2.2. Contacting of the plasmatic protein solution and of the fatty acid was some hundredths of a second in the mixing chamber 12a of the hydrocyclone 48 and, for the rest of the time, this contact was maintained in the following maturation chamber 12b.

Figure 5:
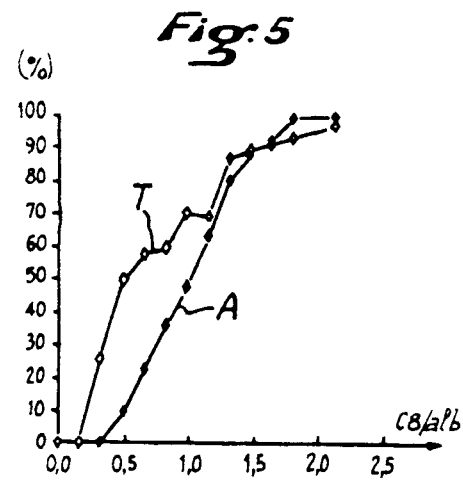
FIGS. 5, 6 and 7 are diagrams illustrating the influence of the caprylic acid content on the selectivity of the precipitation with regard to the proteins.
Figure 6:
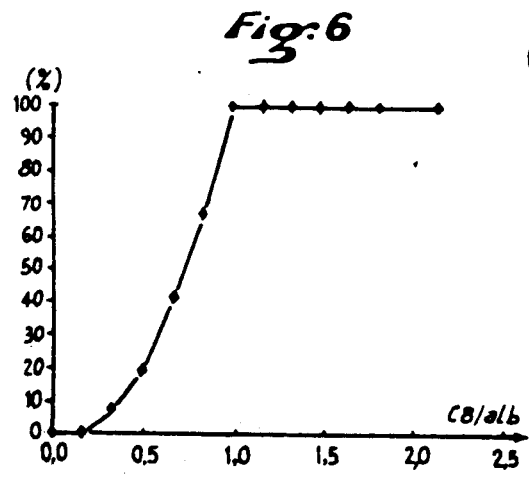
Figure 7:
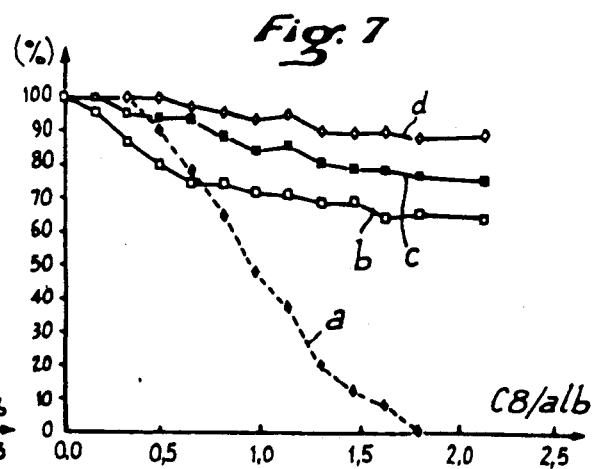

The diagrams of FIGS. 5, 6, 7 illustrate the influence of the caprylic acid content on the selectivity of the precipitation. In fact, depending on the quantity of caprylic acid added, certain proteins are selectively precipitated. The diagram of FIG. 5 illustrates the variation in percentage of albumin (curve A) and of transferrin (curve T) precipitated, indicated on the y-axis, as a function of the weight ratio c8/alb between the caprylic acid and the albumin, indicated on the x-axis. This diagram shows that a weight ratio of 2.2 between the caprylic acid and the albumin is necessary to precipitate all the albumin and transferrin. The diagram of FIG. 6 shows, on the other hand, that a weight ratio of 1 between the caprylic acid and the albumin is sufficient to completely precipitate the alpha 2 macroglobulin (percentage of precipitation plotted on the y-axis). The diagram of FIG. 7 illustrates the variation of the percentage of non-precipitated proteins, i.e. of proteins present in the supernatant, plotted on the y-axis as a function the weight ratio between the caprylic acid and the albumin (c8/alb) plotted on the x-axis. Curves a, b, c and d correspond respectively to the albumin and to the immunoglobulins M, A and G. These tests were carried out at a temperature of 22° C., with a pH of 4.8 and a maturation time of 10 minutes.

Furthermore, the tests have shown that the same selectivity of the precipitation is obtained by using fatty acids other than caprylic acid, such as hexanoic acid (c6) and nonaoic acid (c9). Precipitation of albumin, using these fatty acids, is complete after 5 minutes of contact. However, as the yield of extraction of the immunoglobulins G is lower in the presence of hexanoic acid and the resolubilization of the albumin is less in the presence of nonaoic acid (67%) than in the case of using caprylic acid (80%), it is preferred, for these reasons, to use caprylic acid as precipitating agent.

It has also been observed, in the course of the various tests carried out, that an identical selectivity of the precipitation is obtained for a pH of between 4 and 4.8. On the other hand, for a pH of 5.5, a lower yield of extraction of the immunoglobulins G is observed.

Precipitation may be effected without losing selectivity in a temperature range of between 17° C. and 30° C. If precipitation is effected at a temperature lower than 17° C., albumin is introduced in the supernatent (1% at 14° C.) and if the temperature used is higher than 30° C., the immunoglobulins are denatured.

The process according to the invention has also been applied to the precipitation, by means of caprylic acid, of proteins extracted from soja bean cakes. In this case, the proteins are extracted from the soja bean by means of a sodium chloride solution (0.5M) in a 1/10 weight ratio, at a temperature of 45° C. for 1 hour with a pH of 8.5. The concentration of total proteins which was obtained with such an extraction, is 10.50 g/l. The proteins of the soja bean are then subjected to a first precipitation by change of pH, by adjusting the protein solution to a pH of 4.80 by adding acetic acid. After such an adjustment of the pH to 4.8, a total protein concentration of 8.75 g/l is obtained, which corresponds to a precipitation yield of 17%. It is seen that this precipitation by means of acid precipitates only a small part of the total proteins contained in the extract.

On the other hand, a second precipitation was effected, according to the invention, by complexing of the proteins with caprylic acid, by adding a volume of protein solution at a pH of 4.80, via the hydrocyclone 12a, the volume of emulsion containing the dispersed complexing agent. The ratio of the complexing agent/protein concentrations, expressed in g/g. being fixed at 2.2, a total concentration of proteins in the caprylic supernatant was then obtained, at pH=4.8, equal to 2.70 g/l, or a yield of precipitation with caprylic acid of 69%.

A similar test was carried out on proteins extracted from colza cakes. The proteins of the colza are extracted by a solution of calcium chloride (0.05M) in a weight ratio 1/10, at a temperature of 50° C. for 30 mins. with a pH equal to 10. The protein solution was then adjusted to a pH of 4.8 by the addition of acetic acid, and no precipitation of the proteins of the colza further to the change of pH was observed. A complexing of the proteins with caprylic acid was also effected, under the same conditions as in the case of the example described previously relative to soja bean proteins. In this case, the concentration of total proteins after extraction, with a pH of 10, was 12.50 g/l and this concentration in the caprylic supernatant, with a pH of 4.8, fell to 4.5 g/l, which is translated by a yield of precipitation with caprylic acid of 64%.

What is claimed is:

1. A process for continuously fractionating plant, animal and human proteins by selective precipitation of the proteins resulting from placing a solution of proteins in contact with a precipitating agent consisting essentially of a fatty acid of 6 to 9 carbon atoms, said process consisting essentially of the following steps of:
   continuously placing respective deliveries of a fatty acid of 6 to 9 carbon atoms and of the protein solution in contact in a mixing chamber, mixing the fatty acid and protein solution within hundredths of a second to create a strong stirring in the mixing chamber;
   adjusting the individual rate of delivery of fatty acid and of protein solution to control pH and temperature so as to maintain their ratio equal to a predetermined value;
   then allowing the mixture to evolve during a phase of maturation so as to form a suspension;
   separating this suspension into a liquid part from which are extracted the proteins having remained soluble, and a solid part containing other proteins; and permanently monitoring at least one of the parameters intervening in the process, selected from the group consisting of delivery rate, pressure, temperature, and pH.

2. The process of claim 1, wherein the suspension is separated by filtration in order to obtain a filtrate and a residue.

3. The process of claim 2, wherein the residue is solubilized before selectively extracting the proteins that it contains.

4. The process of claim 1, wherein the suspension is separated by centrifugation in order to obtain a supernatant and a precipitate.

5. The process of claim 1, wherein an emulsion of the fatty acid is continuously formed in a buffer and this emulsion is brought into contact with the protein solution in order to provoke precipitation of the proteins.

6. The process of claim 1, wherein the fatty acid content is varied with respect to the concentration thereof as a function of the proteins which it is desired to precipitate.

7. The process of claim 3, wherein an emulsion of the fatty acid is continuously formed in a buffer and this emulsion is brought into contact with the protein solution in order to provoke precipitation of the proteins.

8. The process of claim 3, wherein the concentration of the fatty acid content is varied as a function of the proteins which it is desired to precipitate.

9. The method of claim 1, wherein the fatty acid is recycled.

10. The method of claim 1, wherein the protein solution contains albumin and the pH is in the range from 4 to 4.8.

11. The method of claim 1, wherein the protein solution contains albumin and the temperature is in the range from 17° to 30° C.

12. The method of claim 1 wherein the protein solution is a volume of plasma previously diluted to 20 g/l in albumin and adjusted to a pH of 4.8, wherein the mixing chamber is a hydrocyclone, a volume of emulsion of dispersed fatty acid being added to the volume of plasma in the hydrocyclone at a weight ration of fatty acid/albumin being 2.2, and wherein the albumin of the plasma is the solid protein which is rapidly precipitated in less than 5 minutes at a temperature of 20° C.

13. The process of claim 1, additionally including monitoring resistivity.

14. The process of claim 1, additionally including monitoring fluid speed.

15. The process of claim 1, wherein said delivery parameter is permanently monitored.

16. The process of claim 1, wherein said pressure parameter is permanently monitored.

17. The process of claim 1, wherein said temperature parameter is permanently monitored.

18. The process of claim 1, wherein the weight ratio of caprylic acid and albumin is 2.2 and all albumin and all transferrin are precipitated.

* * * * *